April 4, 1939.  E. D. LILJA  2,153,195
CONTROL FOR ELECTRIC CIRCUITS
Filed Oct. 17, 1936
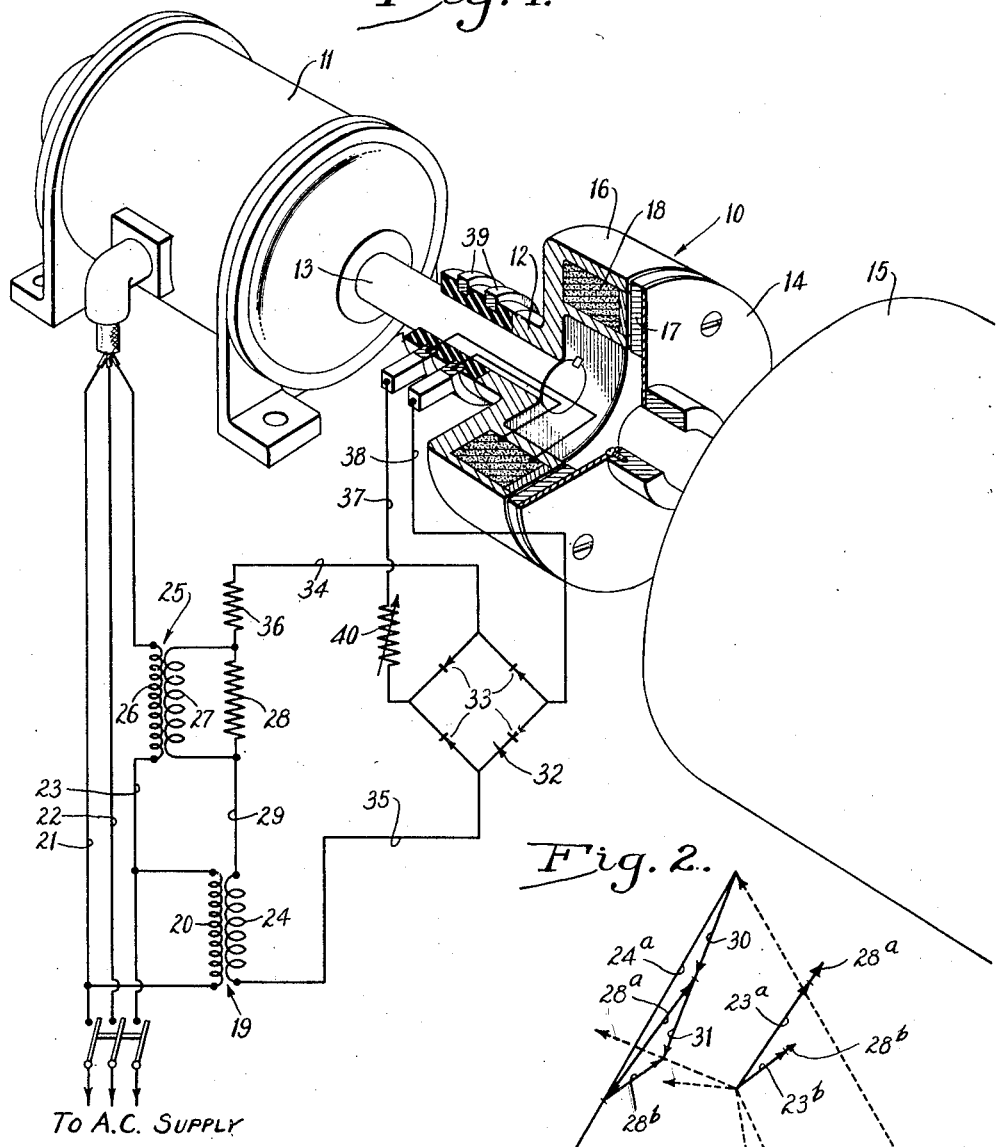
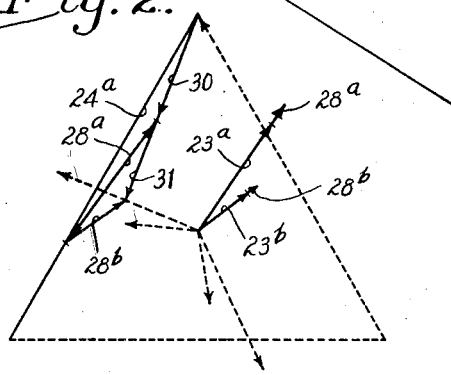
INVENTOR
Edgar D. Lilja
BY
ATTORNEYS Patented Apr. 4, 1939

2,153,195

UNITED STATES PATENT OFFICE 2,153,195

CONTROL FOR ELECTRIC CIRCUITS

Edgar D. Lilja, Rockford, Ill., assignor, by mesne assignments, to Barber-Colman Company, Rockford, Ill., a corporation of Illinois Application October 17, 1936, Serial No. 106,086

2 Claims. (Cl. 172—239)

The invention relates to control apparatus for electric circuits and more particularly to such apparatus which is adapted to control a power transmitting mechanism. The present application discloses an arrangement which is in effect an improvement on that set forth in my copending application Serial No. 1,289, filed January 11, 1935, patented November 24, 1936, No. 2,062,135.

One object of the present invention is to provide a simplified and improved arrangement, requiring a minimum number of parts, for effectively and efficiently controlling a power transmitting mechanism, such as an electromagnetic friction clutch, in accordance with current fluctuations in the circuit of an associated driving motor. The maximum load to which the motor is subjected is thereby limited and the load may be accelerated smoothly.

A more specific object of the invention is to provide an apparatus of the type described including a rectifier subject to variations in efficiency and effectiveness of operation with variations in load and periods of idleness, respectively, the apparatus being of such character that the rectifier is operated with minimum variations in load and is automatically conditioned for effective operation after periods of idleness. I preferably accomplish this by supplying an input current to the rectifier which is of predetermined minimum value sufficient to condition the rectifier for operation after a period of idleness and which has a relatively small percentage change from the minimum value during the normal range of operation of the device so that the corresponding changes in efficiency of the rectifier will be minimized.

The invention also resides in various improvements in the control circuit arrangement disclosed.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which, Figure 1 is a schematic view and wiring diagram of a circuit control mechanism embodying the features of the present invention.

Fig. 2 is a vector diagram illustrating certain voltage and current conditions in the apparatus shown in Fig. 1.

For purposes of illustration, the control contemplated by the invention is shown in Fig. 1 of the drawing for regulating the operation of a power transmission mechanism or electrically excited mechanical coupling 10 so as to limit the load to which an associated driving motor 11 may be subjected. In the particular construction illustrated, the power transmission mechanism 10 comprises an electromagnetically controlled friction clutch of the so-called direct acting type, having a driving member 12 fast on the motor shaft 13 and a driven member 14 connected to a load 15 such as a warp beam. Mounted on said members is an annular magnet core 16 and a mating armature 17 which are drawn into axial gripping engagement upon energization of a winding 18 carried by the core. With a clutch of this character, the degree of frictional gripping engagement and therefore the torque which may be transmitted is dependent on the degree of energization of the winding 18.

It is desirable to utilize an alternating current driving motor because of the simplicity of construction of such motors and general prevalence of alternating current supply systems. The motor 11 illustrated is of the three-phase alternating current type. It is well understood that the current drawn by an electric motor of such character increases and decreases with the load on the motor and that under sufficient overloading, the motor may be damaged. The control apparatus herein contemplated constitutes a simple and effective means for preventing such overloading of the motor. In general, current is supplied to the electromagnetic energizing winding 18 of the power transmission mechanism which varies inversely in accordance with the fluctuations in the energizing current of the motor 11. The degree of energization of the clutch 10 is thus varied so as to cause slippage in the clutch when the load on the motor increases above a safe maximum value. This is accomplished by supplying a direct current to the clutch winding 18 which is the rectifier differential between a relatively constant alternating current and a variable current proportional to the alternating energizing current supplied to the motor 11. Thus the current supplied to the clutch winding 18 is increased as the motor current decreases, and vice versa.

In the preferred construction illustrated, a potential transformer 19 serves as the source of relatively constant alternating current potential. The primary winding 20 of the potential transformer 19 is connected across a pair of the three-phase alternating current supply or energizing conductors 21—22—23 of the motor 11. Then since the motor is energized from a relatively constant potential source of current the voltage induced in secondary winding 24 of the transformer 19 will also be relatively constant.

A current transformer 25 serves as a source of alternating current which fluctuates in accordance with variations in the current supplied to the driving motor. Primary winding 26 of the current transformer 25 is connected in series relation with the motor supply line 23 while the transformer secondary winding 27 is connected across a resistance element 28. It will thus be seen that the alternating current voltage drop across the resistance element 28 will vary directly with fluctuations in the current supplied to the driving motor.

The resistance element 28 and potential transformer secondary winding 24 are connected in series relation and voltage opposition by a conductor 29. These elements thus cooperate to provide an alternating current potential which varies inversely with fluctuations in the current supplied to the driving motor 11. This relation is diagrammatically illustrated in Fig. 2 in which the vector 24$^a$ represents the voltage in the potential transformer secondary winding 24 and the vector 23$^a$ represents the motor current under starting conditions. The vector 28$^a$ represents the corresponding voltage across the resistor 28. The vector sum of the vectors 28$^a$ and 24$^a$ is the vector 30, this being the differential controlling voltage at starting. When the beam or other load 15 comes up to speed, the load on the motor 11 decreases and as a consequence, the line current also decreases and lags the voltage by a greater angle, this new value of current being represented by vector 23$^b$. The corresponding voltage across the resistor 28 is represented by the vector 28$^b$. The vector sum of the vectors 28$^b$ and 24$^a$ is thus represented by the vector 31 which is considerably greater in magnitude than the vector 30. In other words, as was previously noted, a decrease in motor current effects an increase in the controlling voltage or current, and vice versa.

The variable differential alternating current voltage thus obtained is rectified by a rectifier designated generally by the numeral 32 and supplied to the electromagnetic friction clutch 10. The rectifier illustrated is of the full wave type and includes a plurality of copper sulphide disk rectifier elements 33. The input terminals of the rectifier 32 are connected across the differentially related resistance element 28 and transformer secondary winding 24 by conductors 34 and 35. Limitation of the input current to the rectifier to a safe value is effected by a resistor 36 interposed in the conductor 34. The output terminals of the rectifier 32 are connected to the energizing winding 18 of the clutch 10 through conductors 37—38 and suitable slip rings 39. A rheostat 40 interposed in the conductor 37 serves to vary the average value of the current supplied to the electromagnetic actuating winding.

The control described above possesses numerous advantages, especially when utilizing a rectifier which is subject to deterioration during periods of idleness and whose efficiency varies in accordance with the current flowing therethrough. Present day dry disk rectifiers suitable for this use degenerate when not in use and can be reconditioned only by passing a comparatively large current therethrough. In the control arrangement illustrated, it will be seen that the potential transformer 19 serves to supply a predetermined minimum current to the rectifier 32 so that the rectifier elements 33 will be quickly reconditioned for use even after a long period of idleness. Also, rectifier elements of this type have in effect a positive temperature characteristic; that is, the efficiency of the dry disk type rectifier drops considerably with increasing temperature. With the improved circuit arrangement contemplated herein, the current supplied to the rectifier varies through an operating range above a predetermined minimum value and as a result, the percentage variation in rectifier input is greatly reduced. For example, in the particular apparatus illustrated, the normal range of variation in the rectifier input is of the order of 250 per cent of the minimum value. It will thus be seen that the effectiveness of operation of the control apparatus is in general greatly enhanced by supplying a predetermined minimum current to the rectifier, this minimum current being of sufficient magnitude that the percentage variations in load during the normal range of operation are relatively small.

Although a particular embodiment of the invention has been shown and described in some detail for purposes of illustration, there is no intention to thereby limit the invention to this preferred construction, but on the other hand, the appended claims are intended to cover all modifications within the spirit and scope of the invention.

I claim as my invention:

1. The combination of a mechanical coupling device having an energizing winding and driving and driven clutch elements adapted for gripping engagement when the winding is energized, an electric motor arranged to drive said driving element, means providing a source of alternating current for said motor, a rectifier having its output terminals connected to said energizing winding, and means for supplying an alternating current to the input terminals of said rectifier which varies in inverse relation to fluctuation in the current supplied from said source to said motor.

2. The combination of a mechanical coupling device having an energizing winding and driving and driven clutch elements adapted for gripping engagement when the winding is energized, an electric motor arranged to drive said driving element, means providing a source of alternating current for said motor, a rectifier having its output terminals connected to said energizing winding, means for supplying an alternating current to the input terminals of said rectifier which varies in inverse relation to fluctuation in the current supplied from said source to said motor, and means for automatically limiting the current supplied to said rectifier to a safe value.

EDGAR D. LILJA.